United States Patent

[11] 3,615,743

| [72] | Inventor | William John Theuer<br>Chatham, N.J. |
|---|---|---|
| [21] | Appl. No. | 720,323 |
| [22] | Filed | Apr. 10, 1968 |
| [45] | Patented | Oct. 26, 1971 |
| [73] | Assignee | Celanese Corporation<br>New York, N.Y. |

[54] SELF-EXTINGUISHING COMPOSITIONS
11 Claims, No Drawings

[52] U.S. Cl. .................................................. 106/15,
106/177, 106/190, 106/196, 117/136, 252/8.1
[51] Int. Cl. ........................................................ C08b 21/04
[50] Field of Search .......................................... 106/15 FP,
177, 190, 196; 117/136; 252/8.1; 260/963, 45.7 P

[56] References Cited
UNITED STATES PATENTS

| 2,875,229 | 2/1959 | Coover et al. ................. | 260/963 |
|---|---|---|---|
| 3,202,567 | 8/1965 | Muri et al. .................... | 106/15 X |

FOREIGN PATENTS

| 958,120 | 5/1964 | Great Britain................ | 106/15 |

Primary Examiner—Lorenzo B. Hayes
Attorneys—L. Horn, S. D. Murphy and W. J. Mason ABSTRACT: The self-extinguishing properties of cellulose esters are improved without causing an acceleration in light fading of dyes present in the cellulose ester by the incorporation of minor amounts of secondary alkyl phosphates having terminally positioned halogen groups.

SELF-EXTINGUISHING COMPOSITIONS

DISCLOSURE

This invention relates to self-extinguishing compositions of matter and to methods for their preparation. More specifically, the present invention relates to cellulose ester compositions having an additive incorporated therein to impart improved self-extinguishing properties thereto.

Films, fibers, and other structures prepared from cellulose ester compositions, particularly cellulose acetate, are widely used in the industry. While these compositions have properties which render them of great utility in these areas, in certain constructions their flammability properties could stand improvement.

There have been many previous attempts to overcome the aforesaid disadvantage, primarily, the flammability of these materials has been reduced by the incorporation of various additives into the spinning dope used in the preparation of the final product, or by this treatment of the final product with various materials. Various halogenated phosphorous compounds have been found to be of particular utility in overcoming the flammability of these products. For example, U.S. Pat. No. 2,678,309 to Van Gorder et al., discloses a surface treatment of cellulose acetate products with various chlorinated phosphonates. British Pat. No. 958,120 to Nelson Silk, Ltd. discloses the incorporation into the spinning dope of various tris-(di-haloalkyl) phosphates in order to achieve a product having flame retardant properties. While these techniques, and other techniques employed in the industry, have tended to achieve the desired degree of flame retardance, this result has not been obtained without a sacrifice in other desirable properties of the end product.

One of the primary disadvantages observed when using prior art additives is the increased tendency of the products toward light fading. For example, tris (2,3 dibromopropyl) phosphate, a compound observed to impart relatively high self-extinguishing properties to cellulose ester products, results in a product having extreme light fading over a short period of time, e.g. from 20 to 40 hours. Light fading of these products is particularly prevalent when using Class C dyes, compounds often otherwise desirable from an economic standpoint.

Obviously, an additive which would impart self-extinguishing properties to cellulose ester products without producing accelerated fading of dyes in the treated material would be of great utility in the industry. It is an object of the present invention to provide a process for imparting self-extinguishing properties of cellulose ester products while maintaining a product that will be stable to light when dyed.

It is another object of the present invention to provide a cellulose ester dope which can be formed into products having self-extinguishing properties.

It is yet another object of the present invention to provide cellulose ester products having self-extinguishing properties.

It is still another object of the present invention to provide dyed cellulose ester products having self-extinguishing properties and light stability.

Other objects of the present invention, if not specifically set forth herein, will be readily apparent to one skilled in the art from a reading of the following detailed description of the invention.

Surprisingly, it has been found that a certain group of halogenated phosphates will produce self-extinguishing properties in cellulose ester products without accelerating the light fading of such products upon dyeing as has been ordinarily associated with the treatment of cellulose esters with halogenated phosphates.

The compound found to meet these requirements are the secondary alkyl phosphates having terminally positioned halogen atoms. These compounds are represented by the following structure:

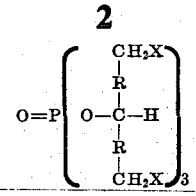

wherein R and R' are alkyl or halogenated alkyl groups, either straight or branched chain of from about 0 to 6 carbon atoms, preferably 0 to 3 carbon atoms, and X is a halogen. Preferred compounds in the present invention are secondary alkyl phosphates wherein at least one of the terminal halogen atoms is bromine. Especially preferred compounds are tris (1-bromo 3-chloroisopropyl) phosphate and tris (1,3-dibromoisopropyl) phosphate. Preferably, these compounds have a total of from about 9 to about 45 carbon atoms, and even more preferably from about 9 to about 27 carbon atoms. Compounds having a higher number of carbon atoms may be employed in the present invention. There is a proportional decrease in the effectiveness of the material in imparting self-extinguishing properties as the molecular weight increases, however, since the relative amount of available halogen atoms is decreased. For this reason, it will be apparent that the lower molecular weight compounds are preferred in the present invention.

Ordinarily, from about 2 to about 15 percent of the above compounds based upon the weight of the final product or weight of solids in the dope will be employed. Preferably, from about 4 to about 10 percent of the compounds are used. While greater amounts of the compound may be employed, such large amounts may not give a corresponding increase in the self-extinguishing properties or exhibit other advantages, and of course, increase the cost of the final product and may produce a loss in elongation and tenacity in fibers. Lower amounts, while producing a degree of the self-extinguishing property in the material, do not increase such self-extinguishing properties to within the range preferred. As a general rule, based upon these conditions, a minor amount of compound sufficient to cause extinction of afterglow of the treated material within 2 seconds after the material has been subjected to flame should be utilized.

In order to obtain the maximum properties of the present compounds, the compounds are preferably incorporated into the dope. In such process, a dope is prepared which ordinarily comprises from about 90 to about 97 parts of a solvent such as acetone; from about 3 to about 10 parts of water; from about 15 to about 45 parts of the cellulose ester; and an amount of halogenated secondary alkyl phosphate determined by the amount of cellulose ester and the previously described desired percentages. Other materials may also be incorporated into the dope, or into the final product. After intimate blending of the dope, the dope may be extruded into films or fibers, or molded into any desired structure. It is also possible to utilize the dope in preparation of spray-spun products, conjugate filaments, and other cellulose ester products known in the industry.

The term "flame retardance" or "fire retardance" as used in the present specification are intended to mean the resistance of the material to flaming as well as the resistance to afterglow, i.e. the glowing of the material after it has been subjected to a flame. The dopes and products of the present invention in addition to the above components contain other materials.

The following examples are presented as illustrative of the invention and are not to be construed as limiting thereof.

EXAMPLE 1

Cellulose acetate hoseleg samples (150/40 yarn) containing the additives noted below were subjected to flammability tests in accordance with AATCC Test Method No. 34/1966 using persistent ignition. The results obtained are set forth in the following table in which S.E. designates self-extinction.

TABLE 1

| Tris (2,3-dibromopropyl) phosphate | | Tris (1-bromo, chloroisopropyl) phosphate | | Tris (1,3-dibromoiosopropyl) phosphate | |
| --- | --- | --- | --- | --- | --- |
| Percent additive | Burning behavior | Percent additive | Burning behavior | Percent additive | Burning behavior |
| 3.6 | S.E. 1 sec | 3.7 | S.E. 1-2 sec | 4.0 | S.E. 1 sec |

It will be noted from the foregoing that the additives of the present invention are substantially equivalent to tris (2, 3-dibromopropyl) phosphate, a commercially successful prior art additive, in imparting self-extinguishing properties to cellulose acetate.

EXAMPLE 2

Cellulose acetate hoseleg samples were scoured at 60° C. for 30 minutes in a solution of 0.5 g/l of Igepon T—77 and 0.5 g/l of calgon using a 40/1 vol./wt. ratio. The scoured hoselegs were then suspended in a solution containing sufficient dye to yield a product having 2 percent of dye on weight of the hoseleg after suspension for 2 hours at 85° C. The dyed products were then subjected to light testing for 20 to 40-hour periods. The degree of light fading was then visually tested. In the following table setting forth the results of these tests, the lower number indicates the greater degree of light fading.

TABLE 2

|  | A | B | C | Dull control | Bright control |
| --- | --- | --- | --- | --- | --- |
| Eastman Blue BNN (20 hr.) (C.I. Name: Disp. Blue 3) (C.I. No.: 61505) (40 hr.) | 2-3<br>1 | 3+<br>2 | 3-4<br>2 | 3-4<br>2-3 | 3-4<br>2 |
| Celliton Pink BA-CF (20 hr.) (C.I. Name: Disp. Red 15) (C.I. No.: 60710) (40 hr.) | 4<br>4 | 4-5<br>4 | 4-5<br>4-5 | 4-5<br>4-5 | 4-5<br>4-5 |

(A) Acetate hoseleg containing Tris (2,3-dibromopropyl) phosphate (B) Acetate hoseleg containing Tris (1-bromo, 3-chloroisopropyl) Phosphate. (C) Acetate hoseleg containing Tris (1,3-dibromoisopropyl) Phosphate. Control–CA, dyed, without fire retardant While the invention has been described with reference to cellulose acetate as the medium to be flameproofed, preferably having an acetyl content calculated as combined acetic acid by weight ranging from about 54 to 62.5 percent, it is generally applicable to cellulose esters of lower aliphatic acids alone or in combination, e.g. cellulose propionate, cellulose butyrate, cellulose acetate butyrate, etc. With these latter esters, the preferred degrees of esterification will correspond to those set forth for cellulose acetate.

It is to be understood that the foregoing detailed description is given merely by way of illustration and than many variations may be made therein without departing from the spirit of the invention.

The embodiments of the invention in which an exclusive property or privilege is claimed are defined as follows: (1-bromo, 3-chloroisopropyl) 3-dibromoisopropyl) into the preparation structures.

1. A process for imparting resistance to light fading and self-extinguishing properties to cellulose acetate structures comprising incorporating from about 2 to 15 percent by weight of the solids in the dope of a secondary alkyl phosphate selected from the group consisting of tris (1-bromo, 3-chloroisopropyl) phosphate and tris (1,3-dibromoisopropyl) phosphate, into the cellulose acetate dope used in the preparation of said structures.

2. The process of claim 1 wherein from about 4 to about 10 percent of the said secondary alkyl phosphate based on the weight of the solids in the dope is employed.

3. The process of claim 1 wherein said cellulose acetate dope comprises from about 90 to 97 parts acetone, from about 3 to 10 parts water, from about 15 to 45 parts cellulose acetate and said secondary alkyl phosphate.

4. A cellulose acetate dope suitable for the preparation of structures exhibiting resistance to light fading and self-extinguishing properties comprising a cellulose acetate dope having incorporated therein from about 2 to 15 percent by weight of the solids in the dope of a secondary alkyl phosphate selected from the group consisting of tris (1-bromo, 3-chloroisopropyl) phosphate and tris (1,3-dibromoisopropyl) phosphate.

5. The product of claim 4 wherein from about 4 to 10 percent of the said secondary alkyl phosphate based on the weight of the solids in the dope is employed.

6. The product of claim 4 wherein said cellulose acetate dope comprises from about 90 to 97 parts acetone, from about 3 to 10 parts water, from about 15 to 45 parts cellulose acetate and said secondary alkyl phosphate.

7. A cellulose acetate structure exhibiting improved resistance to light fading and self-extinguishing properties comprising cellulose acetate having incorporated therein from about 2 to 15 percent by weight of the solids in the dope of a secondary alkyl phosphate selected from the group consisting of tris (1-bromo, 3-chloroisopropyl) phosphate and tris (1,3-dibromoisopropyl) phosphate.

8. THe product of claim 7 wherein said structure is a fiber.

9. The product of claim 7 wherein said structure is a film.

10. THe product of claim 8 wherein said structure is a fabric.

11. A dyed cellulose acetate structure exhibiting improved light stability and self-extinguishing properties comprising a dyed cellulose acetate structure having incorporated therein from about 2 to 15 percent by weight of the solids in the dope of a secondary alkyl phosphate selected from the group consisting of tris (1-bromo,3-chloroisopropyl) phosphate and tris (1,3-dibromoisopropyl) phosphate.